United States Patent Office 3,190,872
Patented June 22, 1965

3,190,872
WATER-SOLUBLE DISAZO DYESTUFFS
Fritz Oesterlein, Basel, and Henri Riat, Arlesheim, Switzerland, assignors to Ciba Corporation, New York, N.Y., a corporation of Delaware
No Drawing. Filed May 21, 1962, Ser. No. 196,451
Claims priority, application Switzerland, May 23, 1961, 5,975/61; Nov. 21, 1961, 13,517/61; Mar. 15, 1962, 3,139/62
7 Claims. (Cl. 260—153)

The present invention provides new disazo-dyestuffs which, as the free acids, correspond to the formula (1)
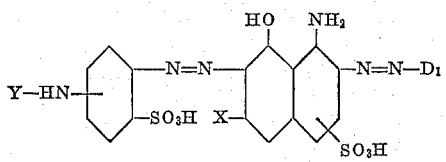

in which X represents a hydrogen atom or a sulfonic acid group, $D_1$ represents a phenyl or naphthyl radical which is free from nitrogen atoms and contains at least one sulfonic acid or carboxylic acid group, and Y represents a reactive heterocyclic substituent.

As reactive substituents represented by the symbol Y there may be mentioned heterocyclic radicals containing at least one halogen atom capable of being split off, such as halogen-quinazoline, halogen-quinoxaline or halogenphthalazine radicals, for example, the trichlorophthalazine radical, and more especially halogen-pyrimidine radicals, such as trichloro- or tetrachloro-pyrimidine radicals, and preferably halogen-triazine radicals, such as dichloro- or dibromo-triazine radicals, and in particular monochlorotriazine radicals of the formula

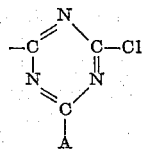

in which A represents an amino group which may be substituted or a substituted hydroxyl group or thio group.

Especially valuable are those dyestuffs of the Formula 1, in which Y represents a 2-amino-4-chloro-1:3:5-triazine radical bound through the —NH-bridge to the phenyl radical in meta-position to the azo bridge, $D_1$ represents a radical of the formula

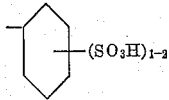

and X represents a sulfonic acid group.

The dyestuffs of the invention can be made by known methods by coupling or condensation. For example, 1-amino-8-hydroxy-naphthalene-3:6- or 4:6-disulfonic acid or 1-amino-8-hydroxynaphthalene-4-sulfonic acid may be coupled, on the one hand, in an acid medium with a diazotized aminobenzene sulfonic acid or aminonaphthalene sulfonic acid, for example, with diazotized ortho-, meta- or para-aminobenzene sulfonic acid, 1- or 2-amino-naphthalene-4-, -5-, -6-, -7- or -8-sulfonic acid, 2-amino-naphthalene-4:8-disulfonic acid, 1-amino-naphthalene-3:6-disulfonic acid, 2-aminonaphthalene-5:7-disulfonic acid or 2-aminonaphthalene-4:6:8-trisulfonic acid and, on the other, in a neutral to alkaline medium with a diazo-compound of an amine of the formula (2)
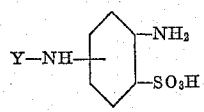

in which Y has the meaning given in connection with Formula 1. Y is advantageously a dihalogen-triazine radical. In this case, the dyestuff formed by the two coupling reactions may be reacted with ammonia, an amine or a hydroxyl- or mercapto-compound to replace one of the two halogen atoms.

The diazotization of the aforesaid aminobenzene sulfonic acid or aminonaphthalene sulfonic acid may be carried out in known manner, for example, with the use of a mineral acid, especially hydrochloric acid or sulfuric acid, and sodium nitrite.

As examples of diazo-compounds of the Formula 2 there may be mentioned those obtainable from the following amines:

4- or 5-[dichloro-(or dibromo)-triazinylamino]-2-amino-benzene-1-sulfonic acid, and amines of the formula (2a)
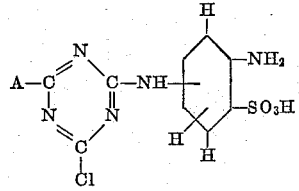

in which A represents an —$NH_2$, $H_3C$—O—, phenoxy, phenylthio, methylamino, hydroxyalkylamino, phenylamino, sulfobenzylamino, N-methyl-phenylamino, sulfonaphthylamino or sulfophenylamino group.

The dyestuffs of the invention can also be made by a modification of the above process, in which a disazodyestuff of the formula (3)
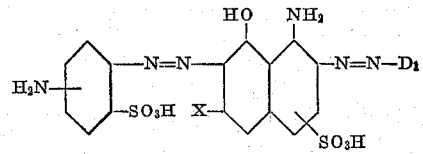

in which X and $D_1$ have the meanings given in connection with Formula 1, is condensed with such a heterocyclic halogen-compound that the resulting dyestuff contains a reactive heterocyclic radical containing at least one halogen atom capable of being split off, whereby the heterocyclic radical reacts with fibrous materials with the formation of a chemical bond.

The dyestuffs of the Formula 3 are obtained, for example, by hydrolyzing an appropriate acylamino-dyestuff, which has been obtained by coupling, for example, 1-amino-8-hydroxynaphthalene-3:6- or -4:6-disulfonic acid or 1-amino-8-hydroxynaphthalene-4-sulfonic acid, on the one hand, with a diazo-compound of one of the aforesaid aminobenzene sulfonic acids or aminonaphthalene sulfonic acids and on the other, with a diazo-compound of meta- or para-acyl- (e.g. para-acetyl)-amino-aniline-ortho-sulfonic acid.

As reactive acylating agents, which are to be condensed with the dyestuffs of the Formula 3, or to be used for making the amines of the Formula 2, there may be mentioned more especially the following:

Tetrahalogen-pyridazines, such as 2:4:5:6-tetrachloropyridazine; halogen-pyrimidines, such as 2:4:6-tri- or 2:4:5:6 - tetra - chloropyrimidine, 5 - bromo - 2:4:6-trichloropyrimidine, 5 - acetyl - 2:4:6 - trichloropyrimidine, 2:4-dichloropyrimidine-5-sulfonic acid, 5-nitro- or 5 - cyano - 2:4:6 - trichloropyrimidine, - 5 - nitro - 6-methyl - 2:4 dichloropyrimidine, 2:6 - dichloropyrimidine-4-carboxylic acid chloride or 2:4-dichloropyrimidine-5-sulfonic acid chloride, and the corresponding bromopyrimidines; and especially cyanuric chloride, 2-methyl-, 2-ethyl- or 2-phenyl-4:6-dichlorotriazine, but preferably dichlorotriazines of the formula (4)

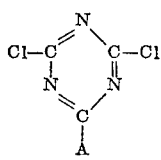

in which A represents the radical of a hydroxyl- or mercapto-compound bound through its oxygen or sulfur atom, or especially an —NH$_2$ group, or the radical of an amino-compound bound through the nitrogen atom which compound, if it is aromatic, advantageously contains a strongly acid group imparting solubility in water.

Dihalogen-triazines of the Formula 4 can be prepared by known methods, for example, by reacting 1 molecular proportion of cyanuric chloride with 1 molecular proportion of ammonia or of a reactive organic compound, especially an at the most secondary amine which, if it is aromatic, advantageously contains at least one acid group imparting solubility in water. As compounds of this kind there may be mentioned:

Aliphatic or aromatic mercapto- or hydroxyl-compounds, such as thio-alcohols, thioglycollic acid, thiourea, thiophenols, mercapto-benzthiazoles, methyl, ethyl or isopropyl alcohol, glycollic acid, phenol, chloro- or nitrophenols, phenol carboxylic or sulfonic acids, naphthols, naphthol sulfonic acids, etc., but more especially ammonia or compounds containing an acylatable amino group, such as hydroxylamine, hydrazine, phenyl-hydrazine, phenyl-hydrazine sulfonic acids, carbamic acid and the derivatives thereof, semi- and thiosemi-carbazides or -carbazones, methyl-, ethyl-, isopropyl-, methoxyethyl- or methoxypropyl-amine, dimethyl-, diethyl-, methyl-phenyl-, or ethylphenyl-amine, chloroethylamine, ethanolamines, propanol amines, benzylamine, cyclohexylamine, morpholine, piperidine, piperazine, amino-carbonic acid esters, amino-acetic acid ethyl ester, aminoethane sulfonic acid, N-methyl-aminoethane sulfonic acid, but preferably aromatic amines, such as aniline, N-methylaniline, toluidines, xylidines, chloranilines, para- or meta-amino-acetanilide, nitranilines, aminophenols, nitro-toluidines, phenylene-diamines, toluylene diamines, anisidine, phenetidine, diphenylamine, naphthylamine, aminonaphthols, diaminonaphthalenes and especially anilines containing an acid group, such as sulfanilic acid, metanilic acid, orthanilic acid, aniline disulfonic acids, amino-benzoic acids, naphthyl-amino-mono-, -di- or -tri-sulfonic acids, aminobenzoic acids, such as 1-hydroxy-5-aminobenzoic acid, aminonaphtholmono-, -di- and -tri-sulfonic acids, etc.

The condensation of the aforesaid halogen-triazines with the dyestuffs of the Formula 3 is carried out by methods in themselves known, advantageously in the presence of an agent capable of binding acid, such as sodium acetate, sodium hydroxide or sodium carbonate, and under conditions such that at least one exchangeable halogen atom remains in the final product, that is to say, for example, in the presence of an organic solvent or at a relatively low to moderately raised temperature in an aqueous medium. If a cyanuric halide, especially cyanuric chloride, is used, the dihalogentriazine-compound first formed can be converted, as stated above in the case of dihalogen-triazine dyestuffs obtained by coupling, into a monohalogen-triazine compound by subsequently exchanging a further halogen atom for one of the radicals represented by the symbol A in the Formula 2a. The reactants used for this purpose are the above-mentioned mercapto-, hydroxy- or amino-compounds, and the reaction conditions are advantageously the same as those given above.

The dyestuffs of the invention are suitable for dyeing or printing a very wide variety of materials, for example fibrous materials of cellulose, such as linen, regenerated cellulose or cotton. They possess excellent building-up properties, and are specially suitable for application by the so-called pad-dyeing method, in which the goods are impregnated with an aqueous dyestuff solution which may also contain salt, and in which the dyestuff is fixed after treatment with an alkali or in the presence of an alkali, if desired, with the application of heat. The dyestuffs of the invention are also suitable for printing, especially by the very fast two-stage printing process in which impregnation with a dyestuff solution and the treatment with an alkili are carried out in two separate stages.

These methods, and the direct dyeing method, which is suitable for many of the dyestuffs of the invention, yield dyeings and prints which are generally, distinguished by their good fastness to light and especially by their excellent fastness to washing. The dyeings and prints are dischargeable. The dyestuffs of the invention are also suitable for dyeing nitrogenous fibers, such as fibers of polyamides, polyurethanes, silk, leather and especially wool, for example, from a weakly acid, neutral or weakly alkaline bath, if desired, in the presence of the usual assistants, for example, ethylene oxide condensation products of amines of high molecular weight.

They are also suitable for printing nitrogenous fibers, for example, wool, silk or union fabrics containing wool.

The following examples illustrate the invention, the parts and percentages being by weight unless otherwise stated, and the relationship of parts by weight to parts by volume being the same as that of the kilogram to the liter:

Example 1

To a solution of the diazo-compound of 17.3 parts of 1-aminobenzene-4-sulfonic acid is added at 10 to 15° C. a solution of the disodium salt of 1-amino-8-hydroxy-naphthalene-3:6-disulfonic acid, and coupling is carried out in the presence of a mineral acid. Coupling is complete after stirring the mixture for several hours, and the reaction mixture is neutralized to a pH-value of 7 with a sodium hydroxide solution. 30 parts of sodium carbonate are then added. The whole is cooled with ice to 5° C., and the diazo compound of the secondary condensation product prepared from 18.5 parts of cyanuric chloride, 18.5 parts of para-aminobenzene sulfonic acid and 18.8 parts of meta-phenylene diamine sulfonic acid is added. When coupling is complete, the dyestuff is precipitated by the addition of sodium chloride, isolated by filtration, and dried. It dyes cellulose fibers to fast blue tints.

Dyestuffs having similar properties are obtained by using 1-aminobenzene-2- or -3-sulfonic acid as diazo-component, instead of 1-aminobenzene-4-sulfonic acid.

Dyestuffs having very similar properties are obtained by using as diazo-component the secondary condensation product prepared from cyanuric chloride, meta-phenylene diamine sulfonic acid and one of the following amines:

1-aminobenzene-2:5-disulfonic acid, 1-aminobenzene-2-sulfonic acid, 1-aminobenzene-2-carboxylic acid, 1-aminobenzene-4-sulfonic acid-2-carboxylic acid, 1-amino-naphthalene-6-sulfonic acid, aminobenzene, N-methyl-aminobenzene, 1-amino-4-acetylaminobenzene and 1-amino-4-methylbenzene.

Dyestuffs having similar properties, but which yield somewhat redder tints, are obtained by using 1-amino-8-hydroxynaphthalene-4:6-disulfonic acid or 1-amino-8-hydroxynaphthalene-4-sulfonic acid, instead of 1-amino-8-hydroxynaphthalene-3:6-disulfonic acid.

Example 2

To a solution of the diazo-compound of 25.3 parts of 1-aminobenzene-2:5-disulfonic acid is added a solution of the disodium salt of 31.9 parts of 1-amino-8-hydroxy-naphthalene-3:6-disulfonic acid, and coupling is carried out in the presence of a mineral acid. Coupling is complete after stirring the mixture for several hours. The reaction mixture is then neutralized to a pH-value of 7 with a sodium hydroxide solution. 30 parts of sodium carbonate are then added, the solution is cooled to 5° C. with ice, and the diazo-compound of the primary condensation product prepared from 18.5 parts of cyanuric chloride and 18.8 parts of meta-phenylene diamine sulfonic acid is added. When coupling is complete, the pH-value is adjusted to 7 with dilute hydrochloric acid, and the second chlorine atom is reacted by the addition of 20 parts of ammonia (solution of 24% strength by volume) at 35 to 40° C. The dyestuff is precipitated by the addition of sodium chloride, isolated by filtration, and dried. It dyes celluose fibers fast greenish blue tints.

Dyestuffs having similar properties are obtained by using an equivalent proportion of monoethanolamine, diethanolamine, methylamine, morpholine, taurine, cyclohexylamine, isopropylamine or 1 - amino - 3 - methoxypropane, instead of ammonia.

Example 3

To a solution of the diazo compound of 25.3 parts of 1-aminobenzene-4-sulfonic acid is added at 10 to 15° C. a solution of the disodium salt of 31.9 parts of 1-amino-8-hydroxy-naphthalene-3:6-disulfonic acid, and coupling is carried out in the presence of a mineral acid. Coupling is complete after stirring the mixture for several hours. The reaction mixture is neutralized to a pH-value of 7 with a sodium hydroxide solution, and 30 parts of sodium carbonate are added. The solution is then cooled to 5° C. with ice, and the diazo-compound of a primary condensation product prepared from 18.5 parts of cyanuric chloride and 18.8 parts of meta-phenylene-diamino sulfonic acid is added. When coupling is complete, the dyestuff is precipitated by the addition of sodium chloride and isolated by filtration. The moist dyestuff is stabilized by adding 10% of its dry weight of a mixture of mono- and di-sodium phosphates, and the mixture is dried in vacuo at 35 to 40° C. It dyes cellulose fibers greenish blue tints.

By using as diazo-component instead of 1-aminobenzene-4-sulfonic acid, an equivalent proportion of 1-aminobenzene-2-sulfonic acid or 1-aminobenzene-2:5-disulfonic acid and otherwise using the same conditions, there are obtained dyestuffs having similar properties.

Example 4

To a solution of the diazo compound of 17.3 parts of 1-amino-benzene-4-sulfonic acid is added a solution of the disodium salt of 31.9 parts of 1-amino-8-hydroxynaphthalene-3:6-disulfonic acid, and coupling is carried out in the presence of a mineral acid. Coupling is complete after stirring the mixture for several hours. The reaction mixture is adjusted to a pH-value of 7 with a sodium hydroxide solution, then rendered weakly alkaline with 30 parts of sodium carbonate, cooled to 5° C. with ice, and the diazo compound of a primary condensation product prepared from 18.5 parts of cyanuric chloride and 18.8 parts of para-phenylene diamine sulfonic acid is added. When coupling is complete the pH-value is adjusted to 7 with dilute hydrochloric acid, and the second chlorine atom is replaced by an amino group by the addition of 20 parts of ammonia solution of 24% strength by volume at 35 to 40° C. The dyestuff is precipitated by the addition of sodium chloride, isolated by filtration, and dried. It dyes cellulosic fibers fast greenish blue tints.

Dyestuffs having similar properties are obtained by using ethylamine, ethanolamine, β-methoxy-ethylamine or isopropanolamine, instead of ammonia.

Example 5

To a solution of the diazo-compound of 30.3 parts of 1-amino-naphthalene-3:6-disulfonic acid is added a solution of the disodium salt of 31.9 parts of 1-amino-8-hydroxynaphthalene-3:6-disulfonic acid, and coupling is carried out in the presence of a mineral acid. Coupling is complete after stirring the mixture for several hours. The reaction mixture is adjusted to a pH-value of 7 with a sodium hydroxide solution. 30 parts of sodium carbonate are added, and the whole is cooled to 5° C. with ice. The diazo-compound of the primary condensation product prepared from 18.5 parts of cyanuric chloride and 18.8 parts of meta-phenylene diamine sulfonic acid. When coupling is complete, the reaction mixture is adjusted to a pH-value of 7 with dilute hydrochloric acid, and the second chlorine atom is reacted by the addition of 20 parts of ammonia solution of 24% strength by volume at 35 to 40° C. The dyestuff is precipitated by the addition of sodium chloride, isolated by filtration and dried. It dyes cellulose fibers fast greenish blue tints.

Example 6

To a solution of the diazo-compound of 17.3 parts of 1-aminobenzene-4-sulfonic acid is added a solution of the disodium salt of 31.9 parts of 1-amino-8-hydroxy-naphthalene-3:6-disulfonic acid, and coupling is carried out in the presence of a mineral acid. Coupling is complete after 3 hours. The reaction mixture is then adjusted to a pH-value of 7 with a sodium hydroxide solution, 30 parts of sodium carbonate are added, and the diazo-compound of 33.6 parts of 1-amino-3-(dichloropyrimidylamino)-benzene-6-sulfonic acid (prepared by the condensation of meta-phenylene diamine sulfonic acid with 2:4:6-trichloropyrimidine in aqueous solution) is run in at 40 to 60° C. When coupling is complete, the dyestuff is precipitated by the addition of sodium chloride, isolated by filtration, and dried. It dyes cellulose fibers fast greenish blue tints.

A dyestuff yielding similar tints and possessing similar properties of fastness is obtained by using a solution of the diazo-compound of 1-amino-3-(trichloropyrimidylamino)-benzene-6-sulfonic acid.

By using 1-aminobenzene-2-sulfonic acid or 1-aminobenzene-2:5-disulfonic acid as the first diazo-compound, instead of 1-aminobenzene-4-sulfonic acid, there are obtained dyestuffs having similar properties.

Example 7

To a solution of the diazo-compound of 25.3 parts of 1-aminobenzene-2:5-disulfonic acid is added a solution of the disodium salt of 31.9 parts of 1-amino-8-hydroxy-naphthalene-3:6-disulfonic acid, and coupling is carried out in the presence of a mineral acid. Coupling is complete after stirring the mixture for several hours. The pH-value is then adjusted to 7 with a sodium hydroxide solution. After the addition of 30 parts of sodium carbonate, the solution is cooled to 5° C. with ice, and a solution of the diazo-compound of 23 parts of 1-amino-3-acetylaminobenzene-6-sulfonic acid is added. When coupling is complete, the acetylamino group split off by hydrolysis at 80 to 90° C. with a sodium hydroxide solution of 4% strength. The dyestuff solution is adjusted to a pH-value of 7 with hydrochloric acid, an aqueous solution of 32.1 parts of 2:4-dichloro-6-phenylamino-1:3:5-triazine-3'-sulfonic acid is then added, and the dyestuff is then condensed at 30 to 40° C. and at a pH-value of 5 to 6 to form a monochlorotriazine dyestuff. The dyestuff is precipitated by the addition of sodium chloride, isolated by filtration, and dried. It dyes cellulose fibers blue tints.

Dyestuffs having similar properties are obtained by using instead of 2:4-dichloro-6-phenylamino-1:3:5-triazine-3'-sulfonic acid, an equivalent quantity of 2:4-dichloro-6-methoxy-1:3:5-triazine or 2:4-dichloro-6-phenoxy-1:3:5-triazine, which advantageously are dissolved in acetone, or of 2:4-dichloro-6-phenylamino-1:3:5-triazine-2'-sulfonic acid.

The corresponding dichlorotriazine derivative is obtained by salting out the dyestuff wtih sodium chloride after the condensation with cyanuric chloride, and working up in the manner described in Example 3. The dyestuff so obtained likewise dyes cotton fast greenish blue tints.

A dyestuff yielding somewhat redder tints, is obtained by using the 1-amino-8-hydroxynaphthalene-4:6-disulfonic acid, instead of 1-amino-8-hydroxynaphthalene-3:6-disulfonic acid.

*Example 8*

To a solution of the diazo-compound of 25.3 parts of 1-amino-benzene-2:5-disulfonic acid is added at 10 to 15° C. a solution of the sodium salt of 23.9 parts of 1-amino-8-hydroxynaphthalene-4-sulfonic acid, and coupling is carried out in the presence of a mineral acid. Coupling is complete after stirring the mixture for several hours. The reaction mixture is then adjusted to a pH-value of 7 with a sodium hydroxide solution. 30 parts of sodium carbonate are then added, the solution is cooled to 5° C. with ice, and the diazo-compound of the primary condensation product prepared from 18.5 parts of cyanuric chloride and 18.8 parts of meta-phenylene diamine sulfonic acid. When coupling is complete, the pH-value is adjusted to 7 with dilute hydrochloric acid, and the second chlorine atom is replaced by reaction with 20 parts of ammonia solution of 24% strength by volume at 35 to 40° C. The dyestuff is precipitated by the addition of sodium chloride, isolated by filtration, and dried. It dyes cellulose fibers fast blue tints.

*Example 9*

To a solution of the diazo-compound of 21.7 parts of 1-carboxy-2-aminobenzene-5-sulfonic acid is added at 15° C. a solution of the disodium salt of 31.9 parts of 1-amino-8-hydroxynaphthalene-3:6-disulfonic acid, and coupling is carried out in the presence of a mineral acid. Coupling is complete after stirring the mixture for several hours. The pH-value is then adjusted to 7 with a sodium hydroxide solution. 30 parts of sodium carbonate are then added, the solution is cooled to 5° C. with ice, and the diazo-compound of the primary condensation product prepared from 18.5 parts of cyanuric chloride and 18.8 parts of meta-phenylene diamine sulfonic acid is added. When coupling is complete, the pH-value is adjusted to 7 with dilute hydrochloric acid, and the second chlorine atom is replaced by reaction with 9.3 parts of aniline at 35 to 40° C. The dyestuff is precipitated by the addition of sodium chloride, isolated by filtration, and dried. It dyes cellulose fibers fast reddish blue tints.

A product having similar properties is obtained by using an equivalent quantity of cyanuric bromide, instead of cyanuric chloride.

*Example 10*

To a solution of the diazo-compound of 30.3 parts of 2-amino-naphthalene-4:8-disulfonic acid is added at 10 to 15° C. a solution of the disodium salt of 31.9 parts of 1-amino-8-hydroxynaphthalene-3:6-disulfonic acid, and coupling is carried out in the presence of a mineral acid. Coupling is complete after stirring the mixture for several hours, and the reaction mixture is neutralized to a pH-value of 7 with a sodium hydroxide solution. 30 parts of sodium carbonate are then added, the reaction mixture is cooled to 5° C. with ice, and the diazo-compound of the primary condensation product prepared from 18.5 parts of cyranuric chloride and 18.8 parts of meta- phenylene diamine sulfonic acid is then added. When coupling is complete, the pH-value is adjusted to 7 with dilute hydrochloric acid, and the second chlorine atom is replaced by reaction with 12.5 parts of ethanolamine at 35 to 40° C. The dyestuff is precipitated by the addition of sodium chloride, isolated by filtration and dried. It dyes cellulose fibers fast greenish blue tints.

*Example 11*

2 parts of the dyestuff obtained as described in the first paragraph of Example 1 are dissolved in 100 parts of water. A cotton fabric is impregnated with the resulting solution in such a manner that its weight is increased by 75%, and the fabric is then dried.

The fabric is then impregnated with a solution having a temperature of 20° C. which contains, per liter, 10 grams of sodium hydroxide and 300 grams of sodium chloride. The fabric is then squeezed to give an increase in weight of 75%, steamed for 60 seconds at 100 to 101° C., rinsed, soaped at the boil for 15 minutes in a solution containing 0.3% of a non-ionic detergent, rinsed and then dried.

*Example 12*

30 parts of the dyestuff obtained in the manner described in Example 1 are dissolved with 150 parts of urea in 380 parts of water, and the solution so obtained is stirred into 400 parts of an aqueous sodium alginate thickening of 5% strength. To the mixture are then added, while stirring, 30 parts of sodium carbonate and 10 parts of an oxidizing agent (for example, Albatex BD=sodium meta-nitrobenzene sulfonate).

A union fabric (40 to 50% of wool and 60 to 50% of cotton) is printed with the printing paste so prepared, and is then dried. The fabric so printed is then steamed for 10 to 15 minutes at 100 to 102° C., rinsed thoroughly, first in cold water and then in hot water, treated at 60° C. in a bath containing 2 parts of ammonia solution of 25% strength per liter of water, and then neutralized in a bath containing 1 part of formic acid of 85% strength per liter of water. The fabric is then dried without an intermediate rinse. A fast blue print is obtained.

What is claimed is:

1. A water-soluble disazo dyestuff of the formula

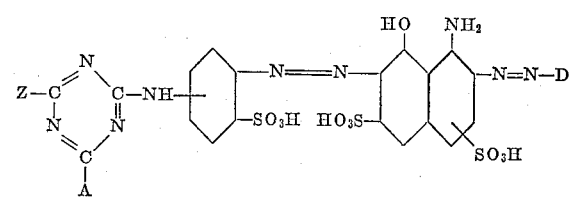

wherein Z is a halogen atom of an atomic number of 17 to 35, A is a member selected from the group consisting of a chlorine atom, amino, lower alkylamino, lower hydroxyalkylamino, lower alkoxyalkylamino, morpholino, cyclohexylamino, lower sulfoalkylamino, lower alkoxy and phenoxy, and D represents a member selected from the group consisting of phenyl and naphthyl, which have as sole substituent a member selected from the group consisting of sulfonic acid and carboxylic acid groups.

2. A water-soluble disazo dyestuff of the formula

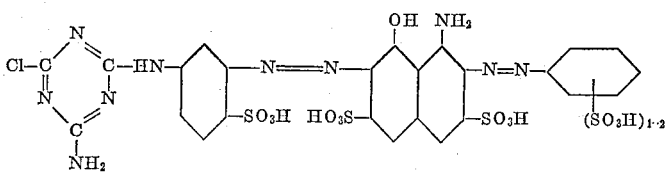

3. The water-soluble disazo dyestuff of the formula

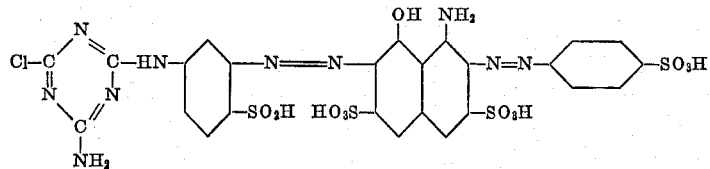

4. The water-soluble disazo dyestuff of the formula

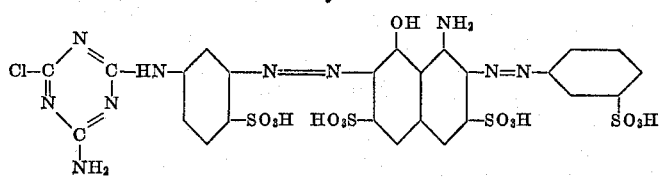

5. The water-soluble disazo dyestuff of the formula

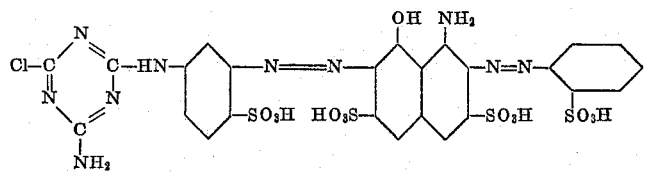

6. The water-soluble disazo dyestuff of the formula

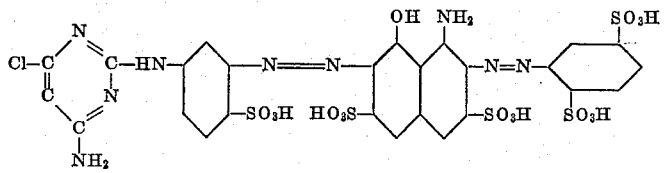

7. The water-soluble disazo dyestuff of the formula

References Cited by the Examiner

UNITED STATES PATENTS 2,945,021   7/60   Fasciati et al. _____ 260—153

FOREIGN PATENTS 214,546   4/61   Austria.

CHARLES B. PARKER, *Primary Examiner.*
L. ZITVER, *Examiner.*